United States Patent
Chu et al.

(10) Patent No.: US 10,303,463 B2
(45) Date of Patent: May 28, 2019

(54) TERMINAL MANAGEMENT FRAMEWORK AND TERMINAL MANAGEMENT METHOD

(71) Applicant: QUARKDATA SOFTWARE CO., LTD, Beijing (CN)

(72) Inventors: Zhihao Chu, Beijing (CN); Weihua Zhang, Beijing (CN); Xue Leng, Beijing (CA)

(73) Assignee: QUARKDATA SOFTWARE CO., LTD, Beijing (CN)

( * ) Notice: Subject to any disclaimer, the term of this patent is extended or adjusted under 35 U.S.C. 154(b) by 0 days.

(21) Appl. No.: 15/634,760

(22) Filed: Jun. 27, 2017

(65) Prior Publication Data

US 2017/0371647 A1 Dec. 28, 2017

(30) Foreign Application Priority Data

Jun. 28, 2016 (CN) .......................... 2016 1 0491139

(51) Int. Cl.
*G06F 8/65* (2018.01)
*G06F 8/70* (2018.01)
*G06F 8/654* (2018.01)

(52) U.S. Cl.
CPC ................ *G06F 8/70* (2013.01); *G06F 8/65* (2013.01); *G06F 8/654* (2018.02)

(58) Field of Classification Search
CPC ... G06F 8/60; G06F 8/65; G06F 8/654; G06F 8/70

(Continued)

(56) References Cited

U.S. PATENT DOCUMENTS

| | | | | |
|---|---|---|---|---|
| 8,005,468 B2 * | 8/2011 | Marolia | .................. | H04L 67/34 455/414.1 |
| 8,095,634 B2 * | 1/2012 | Rao | ......................... | H04L 12/18 709/223 |

(Continued)

FOREIGN PATENT DOCUMENTS

| | | |
|---|---|---|
| CN | 103036917 A | 4/2013 |
| EP | 3035642 A1 | 6/2016 |

OTHER PUBLICATIONS

Fang Cheng et al, Video Engineering, the vol. 35, No. 3, the year of 2011, Research and Design of OMA-DM Architecture and Key Techniques on Embedded System, pp. 57-60.

(Continued)

*Primary Examiner* — Marina Lee
(74) *Attorney, Agent, or Firm* — Yue(Robert) Xu; Apex Attorneys at Law, LLP

(57) ABSTRACT

Provided are a terminal management framework and a terminal management method. The framework includes an application layer, a business layer, a protocol and message processing layer and a porting layer. The application layer includes a device user interface, a business logic module and a tree module. The business layer includes a software component management object module, a firmware update management object module and a lock and wipe management object module. The business logic module is configured to assemble a business logic based on a type of a session and a business type of the session, invoke an interface in a business module to process a business based on the business logic, and control a progress of business processing based on the business logic and a state of the business processing.

14 Claims, 4 Drawing Sheets

(58) Field of Classification Search
USPC .................................................. 717/100–135
See application file for complete search history.

(56) References Cited

U.S. PATENT DOCUMENTS

| | | | | |
|---|---|---|---|---|
| 8,365,162 | B2* | 1/2013 | Rauma | G06F 8/60 |
| | | | | 455/551 |
| 9,479,923 | B2* | 10/2016 | Bajko | H04W 8/20 |
| 9,559,864 | B1* | 1/2017 | Kates | H04L 47/80 |
| 2005/0055453 | A1* | 3/2005 | Zhu | H04L 67/125 |
| | | | | 709/230 |
| 2007/0093243 | A1* | 4/2007 | Kapadekar | H04M 3/42178 |
| | | | | 455/419 |
| 2008/0046583 | A1* | 2/2008 | Rao | H04L 12/18 |
| | | | | 709/230 |
| 2008/0057947 | A1* | 3/2008 | Marolia | H04L 67/34 |
| | | | | 455/425 |
| 2009/0044185 | A1* | 2/2009 | Krivopaltsev | H04L 29/06 |
| | | | | 717/173 |
| 2011/0314462 | A1* | 12/2011 | Clark | G06F 8/65 |
| | | | | 717/169 |
| 2013/0167134 | A1* | 6/2013 | Shim | G06F 8/654 |
| | | | | 717/173 |
| 2014/0315535 | A1* | 10/2014 | Bajko | H04W 8/20 |
| | | | | 455/419 |
| 2016/0196128 | A1 | 7/2016 | Wang et al. | |
| 2017/0371647 | A1* | 12/2017 | Chu | G06F 8/65 |

OTHER PUBLICATIONS

The 1st Office Action regarding Chinese Patent Application No. CN201610491139.X, dated Jul. 23, 2018. English Translation Provided by http://globaldossier.uspto.gov.

* cited by examiner

TERMINAL MANAGEMENT FRAMEWORK AND TERMINAL MANAGEMENT METHOD

CROSS REFERENCE OF RELAYED APPLICATION

The present application claims the priority to Chinese Patent Application No. 201610491139.X, titled "TERMINAL MANAGEMENT FRAMEWORK AND TERMINAL MANAGEMENT METHOD", filed on Jun. 28, 2016 with the State Intellectual Property Office of the PRC, which is incorporated herein by reference in its entirety.

FIELD

The present disclosure relates to the field of information technology, and in particular to a terminal management framework and a terminal management method.

BACKGROUND

Open Mobile Alliance Device Management (OMA DM), i.e. terminal management, is a protocol for managing a terminal in a network with a remote server. With OMA DM, the server can perform various management functions such as a firmware update, a parameter configuration and a data acquisition on the terminal device. A conventional technology is OMA DM software developed by the Red Bend company. A structure of the software includes a platform layer, a middleware layer and an upper application interface layer (i.e. user layer). In the middleware layer as a core of the software, it is mainly achieved a protocol processing, a data parsing and a key data processing. The data interacted with the platform is processed in the platform layer, the data interacted with user and the data refreshed by a user interface is processed in the application layer. In the exiting technical solutions, business modules are disperse, and interfaces are implemented obscurely, thereby not facilitating a rapid integration by a user. In order to be able to use the software to perform integration, the user needs to learn related techniques and businesses for a long time. Therefore, the period is long, the integration efficiency is low and the cost is high.

SUMMARY

In view of the above, the present disclosure provides a terminal management framework and a terminal management method. Hence a user can perform a rapid integration conveniently and effectively with OMA DM.

A terminal management framework is provided according to embodiments of the present disclosure. The terminal management framework includes an application layer, a business layer, a protocol and message processing layer and a porting layer. The application layer includes a device user interface (Device UI), a business logic module (Business Logic) and a tree module (Tree). The business layer includes following business modules: a software component management object (SCOMO) module, a firmware update management object (FUMO) module and a lock and wipe management object (LAWMO) module, business types corresponding to the SCOMO module, the FUMO module and the LAWMO module are respectively a software management, a firmware update and a restore factory setting, an interface for the software management is packaged in the SCOMO module, an interface for the firmware update is packaged in the FUMO module and an interface for the restore factory setting is packaged in the LAWMO module. The protocol and message processing layer is configured to process a protocol and a message used in information transmission between a device and a server. The porting layer is configured to transmit information between the device and the server. The business logic module (Business Logic) is configured to assemble a business logic based on a type of a session and a business type of the session, invoke an interface in a business module corresponding to the business type of the session to process a business corresponding to the business type of the session based on the business logic, and control a progress of business processing based on the business logic and a state of the business processing. The tree module (Tree) is configured to record and manage a function of the device and a configuration of the device in a node manner, and record the state of the business processing generated in controlling the progress of the business processing by the business logic module (Business Logic).

Preferably, the type of the session may include a user-initiated session, a device-initiated session, a server (Server)-initiated normal session and a server-initiated wireless application protocol (Wap) Bootstrap session.

Preferably, the application layer may further include an extension module (Ext) configured to record and manage a function extended by the device in a node manner.

Preferably, the protocol and message processing layer may include at least one of a synchronization markup language (SyncML) module, a WAP PUSH module, a hyper text transport protocol (HTTP) module and a data link (DL) Engine module; and the porting layer may include a platform application program interface (Platform API) and a device platform (Device Platform).

Preferably, the porting layer may further include a plugin module (Plugin) configured to process data specified by the server.

Preferably, the business logic module (Business Logic) may include separate interfaces respectively packaging the user-initiated session, the device-initiated session, the server (Server)-initiated normal session and the server-initiated Wap Bootstrap session, the interfaces are configured to respond to the sessions corresponding to the interfaces, and information of the server is packaged in the interfaces.

Based on the above terminal management framework, a terminal management method is further provided according to the embodiments of the present disclosure. The terminal management method includes:

assembling, by the business logic module (Business Logic), the business logic based on the type of the session and the business type of session, where the business type may include the software management, the firmware update and the restore factory setting, a business module corresponding to the software management is the SCOMO module, a business module corresponding to the firmware update is the FUMO module, a business module corresponding to the restore factory setting is the LAWMO module, the interface for the software management is packaged in the SCOMO module, the interface for the firmware update is packaged in the FUMO module and the interface for the restore factory setting is packaged in the LAWMO module; and invoking, by the business logic module (Business Logic), an interface in the business module corresponding to the business type of the session to process a business corresponding to the business type of the session based on the business logic and controlling, by the business logic module (Business Logic), a progress of the business processing based on the business logic and a current state of the business processing which is recorded in the tree module (Tree), when the session is initiated.

Preferably, the business logic may include a logic of a invoking order of the business modules and interfaces for business types.

Preferably, the business type may further include at least one of a fault diagnosis, a terminal parameter configuration, a parameter acquisition, a dynamical assembling and an application management.

It can be seen from the above that, the terminal management framework and the terminal management method are provided according to the present disclosure. Therefore, a user can perform a rapid integration conveniently and effectively.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION

In order to make objects, technical solutions and advantages of the present disclosure clearer, the technical solution according to the embodiments of the present disclosure will be described clearly and completely as follows in conjunction with the drawings. It is apparent that the described embodiments are only a few rather than all of the embodiments according to the present disclosure. Any other embodiments obtained by those skilled in the art based on the embodiments in the present disclosure without any creative work fall in the protection scope of the present disclosure.

A structure of OMA DM software according to the conventional technologies includes a platform layer, a middleware layer (core layer) and an upper application interface layer (i.e. user layer).

The middleware layer is a core layer of the software, i.e. an OMA DM Core Layer. In this layer, it is mainly achieved a protocol processing, a data parsing and a key data processing. The data interacted with the platform is processed in the platform layer, and the data interacted with user and the data refreshed by a user interface is processed in the application layer.

The middleware layer includes four layers. Each of the four layers corresponds to some operating modules, and an Engine layer and an MOs layer are key layers in the four layers.

In the Engine layer, a protocol and a message are mainly processed. In the layer, a WSP message head of a WAP PUSH short-message is parsed to prepare data for a WAP Bootstrap, a HTTP protocol stack is included to prepare data for parsing a HTTP network and to facilitate a data downloading, and it is convenient to parse, allocate and execute a DM command due to a SyncML processing.

In the MOs layer, a FUMO module, a SCOMO module and a LAWMO module are mainly implemented to respectively achieve a firmware update, a software management and a restore factory setting. In this layer, data processed in the Engine layer is used to process a business.

Each module includes a series of initiation interfaces, configuration interfaces and data processing interfaces. Therefore, in order to select right interfaces from these interfaces to complete a DM business, a user needs to understand the DM business. The selecting process has a low efficiency and a high cost. In the exiting technical solutions, business modules are disperse, and interfaces are implemented obscurely, thereby not facilitating a rapid integration by a user. In order to perform the rapid integration, the user needs to learn related techniques and businesses for a long time. In this case, the period is too long, the integration efficiency is low and the cost is high.

In order to overcome the defects in the conventional technologies, a terminal management framework and a terminal management method are provided according to embodiments of the present disclosure. Hence the user can perform a rapid integration conveniently and effectively.

First Embodiment

Figure 1:
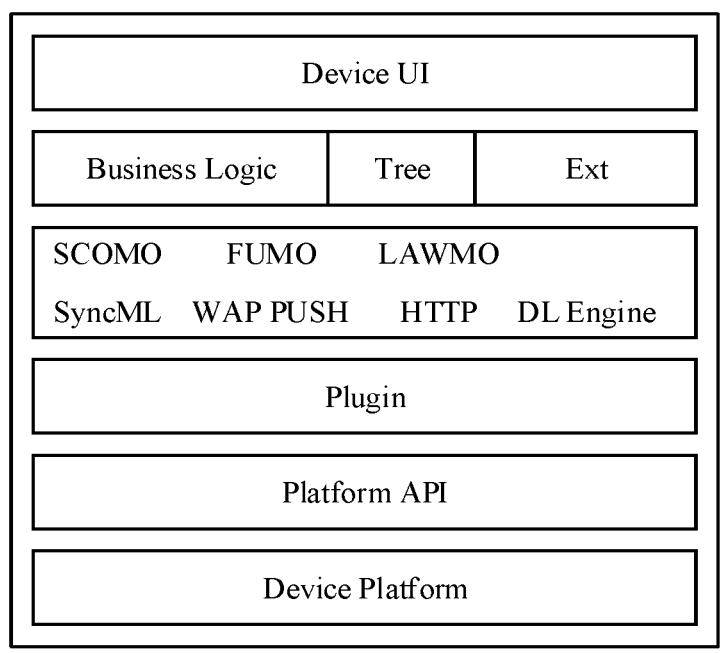
FIG. 1 is a schematic structural diagram of a terminal management framework according to an embodiment of the present disclosure.

FIG. 1 shows a terminal management framework according to an embodiment of the present disclosure. The terminal management framework includes an application layer, a business layer, a protocol and message processing layer and a porting layer. The application layer includes a device user interface (Device UI), a business logic module (Business Logic) and a tree module (Tree).

The device user interface is configured to present data to a user or process an input from the user. State and progress of business processing may be reflected on the device user interface in real time. For example, in a case of a firmware downloading business, the progress of the business processing and whether the business is completed are displayed on the device user interface.

The business logic module (Business Logic) is configured to assemble a business logic based on a type of a session and a business type of the session, invoke an interface in a business module corresponding to the business type of the session to process a business corresponding to the business type of the session based on the business logic and control a progress of the business processing based on the business logic and a state of the business processing. The type of the session includes a user-initiated session, a device-initiated session, a server (Server)-initiated normal session or a server-initiated Wap Bootstrap session.

The tree module (Tree) is configured to record and manage functions and configurations of the device in a node manner, and record the state of the business processing generated in controlling the progress of the business processing by the business logic module (Business Logic).

The application layer may further includes an extension module (Ext) configured to record and manage a function extended by the device in a node manner.

The business layer includes the following business modules: a SCOMO module, a FUMO module and a LAWMO module. Business types corresponding to the SCOMO module, the FUMO module and the LAWMO module are respectively a software management, a firmware update and a restore factory setting. An interface for the software management is packaged in the SCOMO module, an interface for the firmware update is packaged in the FUMO module and an interface for the restore factory setting is packaged in the LAWMO module.

The FUMO module mainly includes a task initiating interface, a downloading request interface and a state acquisition interface. The task initiating interface is configured to initiate a FUMO task request to a server and wait for a reply from the server. The downloading request interface is configured to request a downloading task from a downloading module if it is determined that an available upgrading firmware exists. The state acquisition interface is configured to acquire a downloading progress of the downloading module, a firmware installing result and a state such as whether a user cancels or delays a task, and report the acquired information to the server.

The SCOMO module mainly includes an update request interface, a software installing or uninstalling interface and a software state acquisition interface. The update request interface is configured to initiate an update request to the server if it is determined that a software needs to be updated or it is checked by the server actively that a software needs to be updated. The software installing or uninstalling interface is configured to perform a software installing or uninstalling task. The software state acquisition interface is configured to maintain a software state and a software installing or uninstalling state, and report the states to the server.

The LAWMO module mainly includes a task initiation interface, a data parsing interface and a state acquisition interface. The task initiation interface is configured to initiate a LAWMO task request to the server and wait for a reply from the server. The data parsing interface is configured to parse data replied by the server and then provide the parsed data to the device interface for processing. The state acquisition interface is configured to acquire a performing result of the device and then feed the result back to the server.

The protocol and message processing layer is configured to parse a protocol used in information transmission between the device and the server. And the protocol and message processing layer includes at least one of a SyncML module, a WAP PUSH module, a HTTP module and a DL Engine module.

The SyncML module is configured to parse a command of a DM server. The WAP PUSH module is configured to parse a WAP message command. The HTTP module is configured to parse a HTTP message command and package a request data package. And the DL Engine module is configured to download data.

The porting layer is configured to transmit information between the device and the server. The porting layer includes a platform application program interface (Platform API) and a device platform (Device Platform), and may further include a plugin module (Plugin) configured to process data specified by the server. Specifically, a plugin management is introduced in the present disclosure, and a high-efficiency integration of DM may be performed with the plugin. Server data is processed with key codes of the DM and is finally provided to the plugins for processing. The plugins may be various platforms. In this case, there is no need to redesign the key codes for different platforms, and only plugins corresponding to different platforms need to be developed for processing data, thereby saving developing time for a customer. The customer may only process a device function corresponding to a node regardless of a business.

Second Embodiment

Based on an invention concept same as that of the above terminal management framework, a terminal management method is further provided according to an embodiment of the present disclosure. And the terminal management method includes steps S101 to S105.

In step S101, a business logic is assembled based on the type of the session and the business type of the session. And interfaces for different business types are respectively packaged in the business modules separately.

The type of the session includes a normal DM session and a Wap Bootstrap session. And the normal DM session includes a device-initiated DM session, a user-initiated DM session and a server-initiated DM session.

The business type includes but is not limited to at least one of a firmware update, a software management, a restore factory setting, a fault diagnosis, a terminal parameter configuration, a parameter acquisition, a dynamical assembling and an application management.

The business logic includes at least a logic of a invoking order of modules and interfaces for the business types.

The business module includes but is not limited to at least one of a firmware update module (FUMO module), a software management module (SCOMO module) and a restore factory setting module (LAWMO module).

In step S102, a business logic corresponding to the session is selected when the session is initiated.

The business logic is selected based on the type of the session and the business type of the session. For example, a firmware update logic of the business logic is selected in a case that a firmware update needs to be performed, a software management logic of the business logic is selected in a case that a software management needs to be performed, and a restore factory setting logic of the business logic is selected in a case that a restore factory setting needs to be performed.

In step S103, a business module corresponding to the business type of the session is selected based on the business logic to process a business corresponding to the business type of the session.

The interfaces in the business modules in step S101 are invoked to process the corresponding businesses.

Information of a user terminal may be further acquired from a server by reading a basic configuration file in the tree module (Tree). For example, the basic configuration file may be serial number, model, manufacture, firmware version number and system language of a mobile phone. The system language may be Chinese, English, Japanese or the like. And a business corresponding to the terminal with the version may be further processed based on the information of the terminal.

In a case that the session is a server-initiated normal session, the HTTP module parses a HTTP message and provides the parsed HTTP message to the SyncML module for parsing to obtain a server command. And the SyncML module sends the command obtained by parsing to the business module for processing.

In a case that the session is a Wap Bootstrap session, after receiving a WAP message, a DM server provides the message to the WAP PUSH module for parsing to obtain a command. And the WPA PUSH module sends the command obtained by parsing to the business module for processing.

In step S104, the progress of the business processing is controlled based on the business logic and a current state of the business processing.

The business module acquires the current state of the business processing and feeds the current state back to the server. And the progress of the current business processing is further controlled based on the business logic. The progress of the business processing, such as whether a downloading is started, a progress of the downloading or whether the downloading is completed, may be reflected on a user interface.

In step S105, data processed by the business module is provided to a plugin for a further data processing.

In the present disclosure, a plugin management is introduced, and a high-efficiency integration may be performed with a plugin. Server data is processed with key codes of a DM and is finally provided to plugins for processing. In this case, there is no need to redesign the key codes for different platforms, and only plugins corresponding to different platforms need to be developed for processing data, thereby saving developing time for a customer. The customer may only process a device function corresponding to a node regardless of a business.

Moreover, in the present disclosure, platform system interfaces used by DM software are sorted unifiedly, and the interfaces are implemented with a platform that the customer is familiar with.

Figure 2:
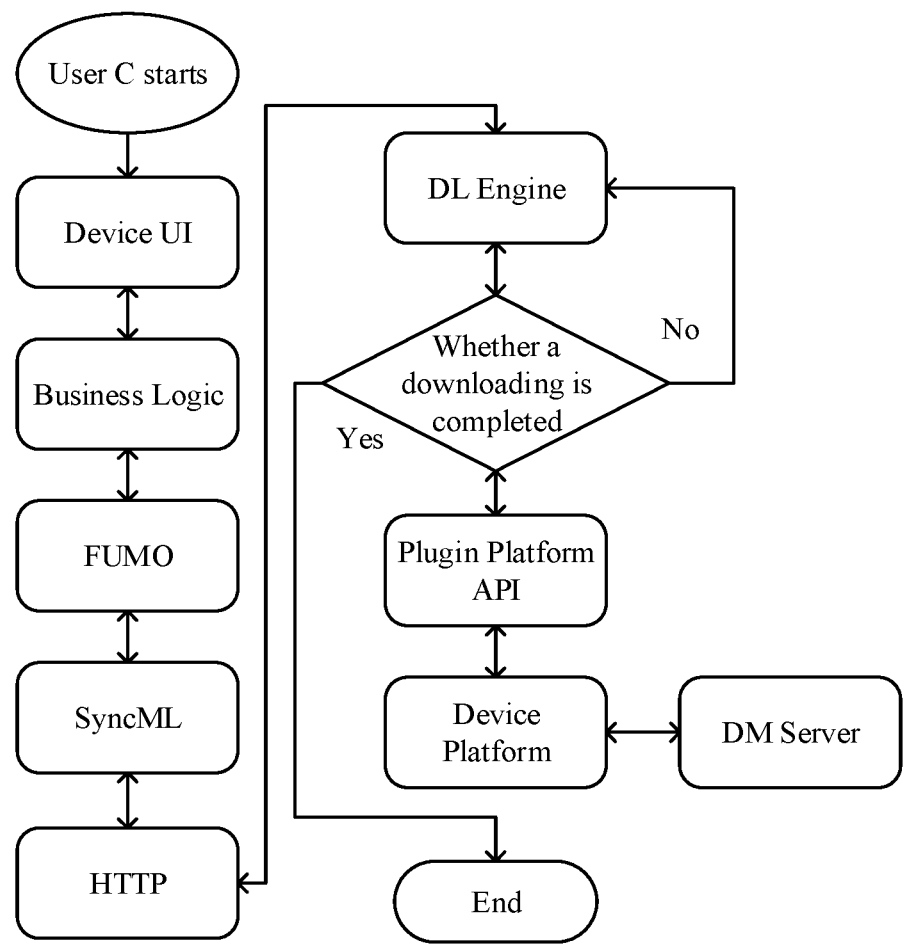
FIG. 2 is a flowchart showing a processing flow of a user-initiated firmware update business according to an embodiment of the present disclosure.

FIG. 2 shows a processing flow of a user-initiated firmware update (FUMO) business. Specifically, a user inputs on a device interface. The device interface sends the inputted firmware update business requirement to the business logic module. A business logic in the business logic module corresponding to the business requirement is selected. A FUMO business module is selected based on the business logic. The task initiation interface of the FUMO business module initiates a FUMO task request to the server and waits for a reply from the server. The FUMO business module may acquire version information of a client by reading a configuration file from the tree module. The DM server sends an address of a firmware upgrade package corresponding to the client version and managing commands for downloading the firmware upgrade package. The SyncML module parses the command from the DM server and sends parsed command to the HTTP module. The HTTP module performs an address parsing. A HTTP request data package is packaged into a TCP package, and then a TCP connection is established. After the connection is established, a downloading request interface of the FUMO business module is invoked to request a downloading task from the downloading module, and the downloading module requests the firmware upgrade package from a downloading server. And the downloading module starts a download once the downloading server sends the firmware upgrade package. The state acquisition interface of the FUMO business module may acquire a state such as a downloading progress, a firmware installing result, whether the user cancels or delays a task, of the downloading module, and report the state to the DM server. If it is determined that the downloading module completes the downloading, information after the downloading is sent to the plugin module (Plugin). The plugin module includes plugins for data processing which are adapted to different platforms. The platform API module is configured to implement the platform system interfaces with platforms that the user is familiar with. The device platform layer further processes the data and sends the processing result to the server.

Figure 3:
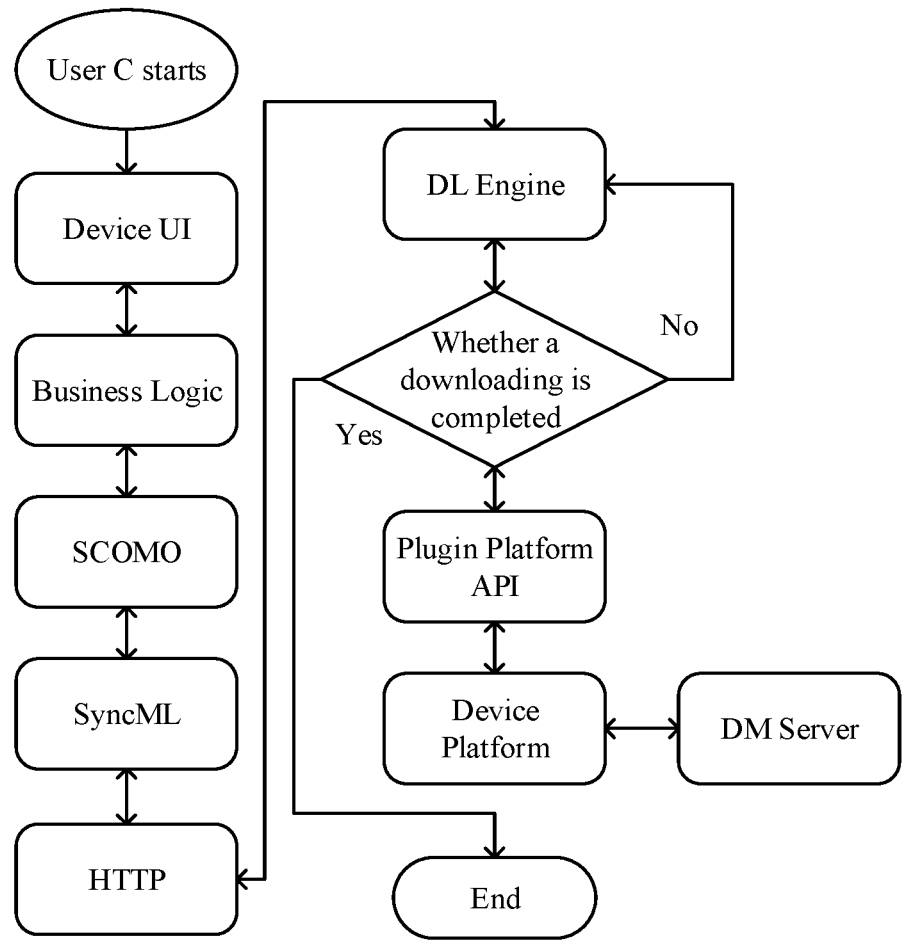
FIG. 3 is a flowchart showing a processing flow of a user-initiated software management business according to an embodiment of the present disclosure.

FIG. 3 shows a processing flow of a user-initiated software management (SCOMO) business. Specifically, a user inputs on a device interface. The device interface sends the inputted software management business requirement to the business logic module. A business logic in the business logic module corresponding to the business requirement is selected. A SCOMO business module is selected based on the business logic. In a case that it is determined by the update request interface of the SCOMO business module that a software needs to be updated or it is checked by the server that a software needs to be updated, an update request is sent to the server. The server replies with a software update command. The SyncML module parses the command from the server and sends the parsed command to the HTTP module. The HTTP module performs an address parsing. A HTTP request data package is packaged into a TCP package, and then a TCP connection is established. After the connection is established, the software installing or uninstalling interface is invoked to perform a software installing and uninstalling task. The software state acquisition interface maintains a state of the software installing and uninstalling, and reports the state to the DM server. The downloading module downloads a software update package. If it is determined that the downloading module completes the downloading, information after the downloading is sent to the plugin module (Plugin). The plugin module includes plugins for data processing which are adapted to different platforms. The Platform API module is configured to implement the platform system interfaces with a platform that the user is familiar with. The device platform layer further process the data and sends the processing result to the server.

Figure 4:
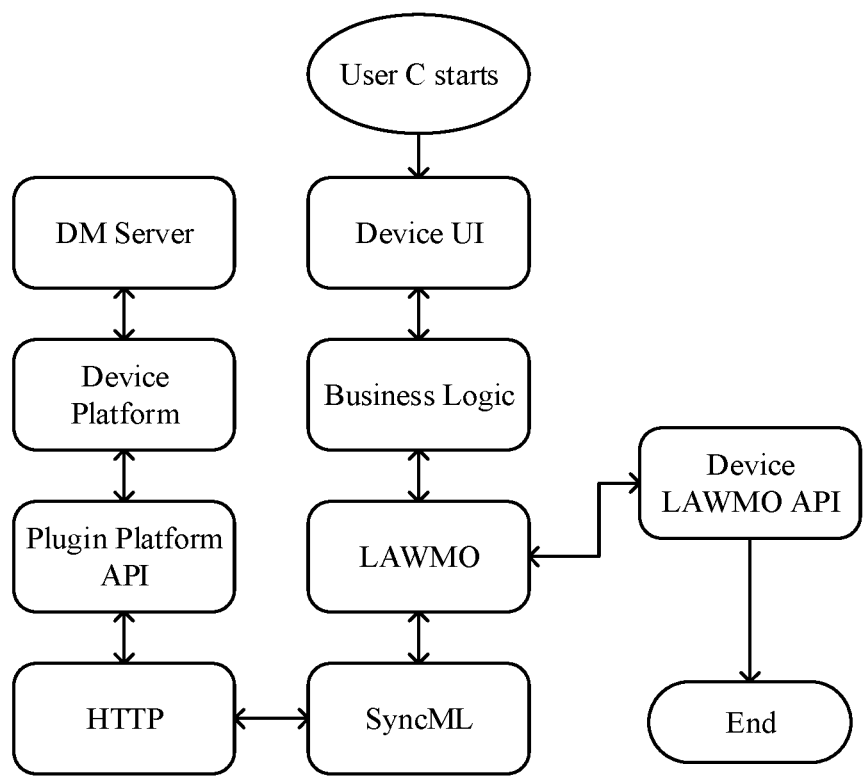
FIG. 4 is a flowchart showing a processing flow of a user-initiated restore factory setting business according to an embodiment of the present disclosure.

FIG. 4 shows a processing flow of a user-initiated restore factory setting (LAWMO) business. Specifically, a user inputs on a device interface. The device interface sends the inputted restore factory setting business requirement to the business logic module. A business logic in the business logic module corresponding to the business requirement is selected. A LAWMO business module is selected based on the business logic. The task initiation interface of the LAWMO business module initiates a LAWMO task request to the server and waits for a reply from the server. The LAWMO business module may acquire version information of a client by reading a configuration file from the tree module. The DM server sends managing commands for restoring factory settings corresponding to the client version. The data parsing interface is invoked to parse data replied from the DM server and then provide the parsed data to the device interface for processing. The state acquisition interface acquires a performing result of the device and feeds the result back to the DM server. The SyncML module parses the command from the DM server. The HTTP module performs an address parsing. A HTTP request data package is packaged. The plugin module includes plugins for data processing which are adapted to different platforms. The Platform API module is configured to implement the platform system interfaces with a platform that the user is familiar with. And the device platform layer further process the data and sends the processing result to the server.

The foregoing embodiments are only preferred embodiments of the present disclosure and are not intended to limit the present disclosure. All modifications, equivalent substitutions and improvements made within the spirit and principle of the present disclosure fall in the protection scope of the present disclosure.

The invention claimed is:

1. A non-transitory storage medium having a plurality of instructions stored thereon, wherein the plurality of instructions comprise a terminal management framework comprising:
an application layer, wherein the application layer comprises a device user interface, a business logic module and a tree module;
a business layer, wherein the business layer comprises the following three business modules: a software component management object module, a firmware update management object module and a lock and wipe management object module, business types corresponding to the three business modules are respectively a software management, a firmware update and a restore factory setting, an interface for the software management is packaged in the software component management object module, an interface for the firmware update is packaged in the firmware update management object module and an interface for the restore factory setting is packaged in the lock and wipe management object module;
a protocol and message processing layer, configured to process a protocol and a message used in information transmission between a device and a server; and
a porting layer, configured to transmit information between the device and the server,
wherein the business logic module is configured to assemble a business logic based on a type of a session and a business type of the session, invoke one of the interfaces in the business modules to process a corresponding business based on the business logic, and control a progress of business processing based on the business logic and a state of the business processing; and
the tree module is configured to record and manage a function of the device and a configuration of the device in a node manner, and record the state of the business processing generated in controlling the progress of the business processing by the business logic module.

2. The non-transitory storage medium according to claim 1, wherein the type of the session comprises a user-initiated session, a device-initiated session, a server-initiated normal session and a server-initiated wireless application protocol bootstrap session.

3. The non-transitory storage medium according to claim 1, wherein the application layer further comprises an extension module configured to record and manage a function extended by the device in a node manner.

4. The non-transitory storage medium terminal according to claim 1, wherein,
the protocol and message processing layer comprises at least one of a synchronization markup language module, a wireless application protocol push module, a hypertext transport protocol module and a data link engine module; and
the porting layer comprises a platform application program interface and a device platform.

5. The non-transitory storage medium according to claim 4, wherein the porting layer further comprises a plugin module configured to process data specified by the server.

6. The non-transitory storage medium according to claim 2, wherein the business logic module comprises separate interfaces respectively packaging the user-initiated session, the device-initiated session, the server-initiated normal session and the server-initiated wireless application protocol bootstrap session, the interfaces are configured to respond to the sessions corresponding to the interfaces, and information of the server is packaged in the interfaces.

7. A terminal management method based on a terminal management framework, wherein
the terminal management framework comprises:
an application layer, wherein the application layer comprises a device user interface, a business logic module and a tree module;
a business layer, wherein the business layer comprises the following three business modules: a software component management object module, a firmware update management object module and a lock and wipe management object module, business types corresponding to the three business modules are respectively a software management, a firmware update and a restore factory setting, an interface for the software management is packaged in the software component management object module, an interface for the firmware update is packaged in the firmware update management object module and an interface for the restore factory setting is packaged in the lock and wipe management object module;
a protocol and message processing layer, configured to process a protocol and a message used in information transmission between a device and a server; and
a porting layer, configured to transmit information between the device and the server, and
the terminal management method comprises:
assembling, by the business logic module, a business logic based on a type of a session and a business type of the session; and
invoking, by the business logic module, an interface in the business module corresponding to the business type of the session to process a business corresponding to the business type of the session based on the business logic and controlling, by the business logic module, a progress of business processing based on the business logic and a current state of the business processing which is recorded in the tree module, when the session is initiated.

8. The terminal management method according to claim 7, wherein the business logic comprises a logic of an invoking order of the business modules and interfaces for the business types.

9. The terminal management method according to claim 7, wherein the business type further comprises at least one of a fault diagnosis, a terminal parameter configuration, a parameter acquisition, a dynamical assembling and an application management.

10. The terminal management method according to claim 7, wherein the type of the session comprises a user-initiated session, a device-initiated session, a server-initiated normal session and a server-initiated wireless application protocol bootstrap session.

11. The terminal management method according to claim 7, wherein the application layer further comprises an extension module configured to record and manage a function extended by the device in a node manner.

12. The terminal management method according to claim 7, wherein,
the protocol and message processing layer comprises at least one of a synchronization markup language module, a wireless application protocol push module, a hypertext transport protocol module and a data link engine module; and
the porting layer comprises a platform application program interface and a device platform.

13. The terminal management method according to claim 12, wherein the porting layer further comprises a plugin module configured to process data specified by the server.

14. The terminal management method according to claim 10, wherein the business logic module comprises separate interfaces respectively packaging the user-initiated session, the device-initiated session, the server-initiated normal session and the server-initiated wireless application protocol bootstrap session, the interfaces are configured to respond to the sessions corresponding to the interfaces, and information of the server is packaged in the interfaces.

* * * * *